United States Patent [19]
Crompton

[11] 4,070,567
[45] Jan. 24, 1978

[54] MARKER LAMP WITH RESILIENT BULB SUPPORT
[75] Inventor: Kenneth J. Crompton, Willowdale, Canada
[73] Assignee: Dominion Auto Accessories Limited, Toronto, Canada
[21] Appl. No.: 716,584
[22] Filed: Aug. 23, 1976
[51] Int. Cl.² ............................................. B60Q 1/32
[52] U.S. Cl. ...................................... 362/390; 313/50; 339/93 L; 362/267
[58] Field of Search .................... 240/8.2, 8.22, 7.1 R, 240/90; 339/93 L; 313/50

[56] References Cited
U.S. PATENT DOCUMENTS

| | | | |
|---|---|---|---|
| 2,686,868 | 8/1954 | Diedring | 240/7.1 R |
| 2,860,233 | 11/1958 | Johnson | 240/90 X |
| 3,145,933 | 8/1964 | Dickson | 240/8.2 |
| 3,300,636 | 1/1967 | Quelland et al. | 240/90 |
| 3,327,110 | 6/1967 | Baldwin | 240/8.2 X |
| 3,484,600 | 12/1969 | Fradette | 240/8.2 X |
| 3,955,872 | 5/1976 | Brudy | 339/93 L |
| 3,980,878 | 9/1976 | Crompton | 240/90 X |

Primary Examiner—Richard L. Moses
Attorney, Agent, or Firm—Barnes, Kisselle, Raisch & Choate

[57] ABSTRACT

A marker lamp comprising a base, a complementary resilient support member and a retainer engaging the support member and maintaining it in position on the base. A bulb socket assembly includes an upper member engaging opposed resilient columns integral with the support member and the lower member having an integral bulb-base contact element engaging a central column integral with the support member. The opposed resilient columns have recesses which engage outwardly extending elements integral with the upper bulb socket assembly member in a manner permitting freedom of movement, thus limiting shock transmission from the vehicle to the bulb filament.

17 Claims, 4 Drawing Figures

MARKER LAMP WITH RESILIENT BULB SUPPORT

This invention relates to marker lamps.

BACKGROUND OF THE INVENTION

In automotive vehicles, and particularly trucks, it is conventionally required by regulations that the extremities of the vehicle be clearly outlined by lamps during night operation. Separate lamps are generally used on the front, rear and sides of commercial vehicles, and a typical lamp of this kind is shown and described in U.S. Pat. No. 3,145,933.

In prior devices, an often sought goal has been the reduction of shock and vibration transmission from the vehicle to the bulb filament. Many systems proposed to date have offered substantial improvement to rigidly-mounted lamp systems, but each has also demonstrated significant disadvantages; some of which have been difficult assembly, improper optical location, and relatively expensive components.

The aforementioned U.S. Pat. No. 3,145,933 is an example of the type of system to which this invention is directed. This construction comprises a "dumbbell" shaped column of resilient material upon which an engagement is made with a slotted socket member. The geometry of the engagement does not provide significant correction for the wide latitude of tolerance necessary for the column construction.

Among the objects of the invention are to provide an improved marker lamp which utilizes a minimum number of parts; which is readily assembled; and which effectively supports the bulb against shock and vibration occurring during movement of the vehicle thereby providing for long life of the bulb.

SUMMARY OF THE INVENTION

In accordance with the invention, the marker lamp comprises a base, a resilient support having a surface complementary to the base and three columns integral therewith. A retainer engages the support and maintains it in complementary position to the base. A bulb socket assembly is mounted on the two outer columns on the support to hold the bulb in an accurate optical location and includes a bulb-base engaging contact member which is resiliently supported by the central column on the resilient support member. The interrelationship of the components allows for simple assembly and accurate retention of bulb location.

DESCRIPTION

Figure 1:
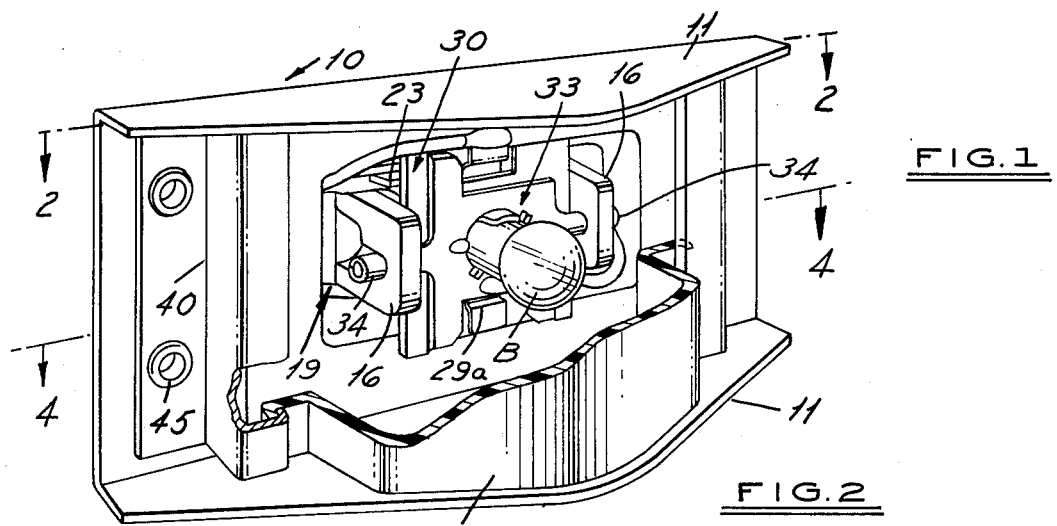
FIG. 1 is a part sectional perspective view of a marker lamp embodying the invention.
Figure 2:
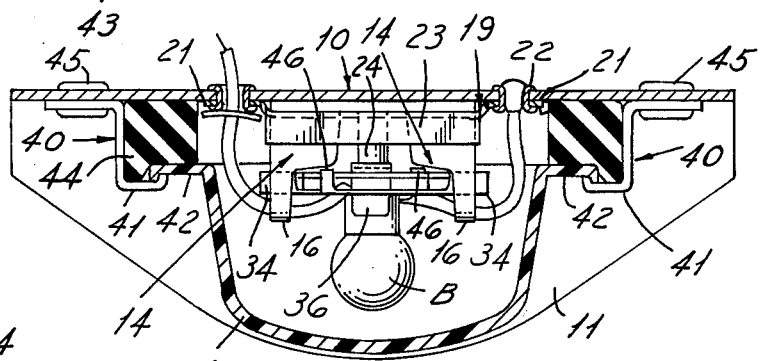
FIG. 2 is a sectional view taken along the line 2—2 in FIG. 1.
Figure 3:
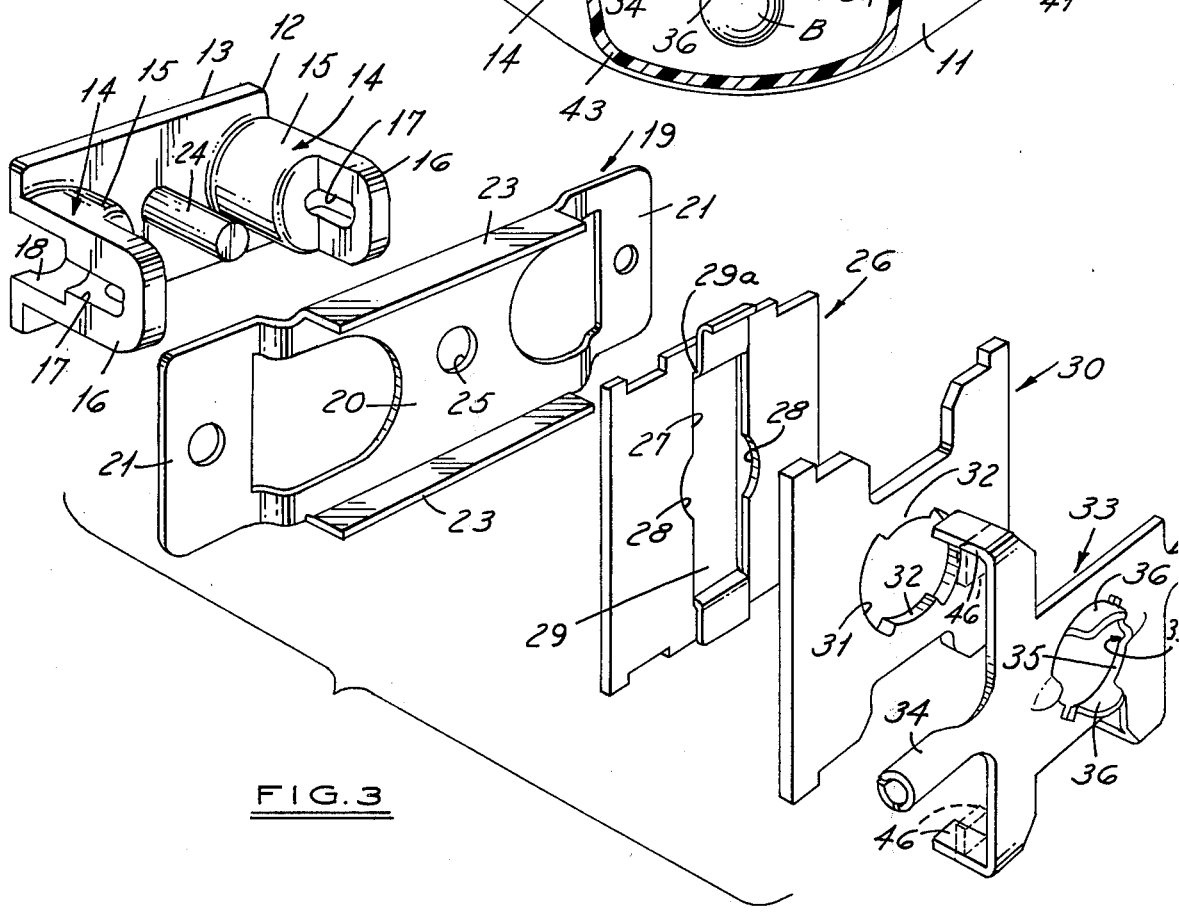
FIG. 3 is an exploded perspective view of parts of the marker lamp.
Figure 4:
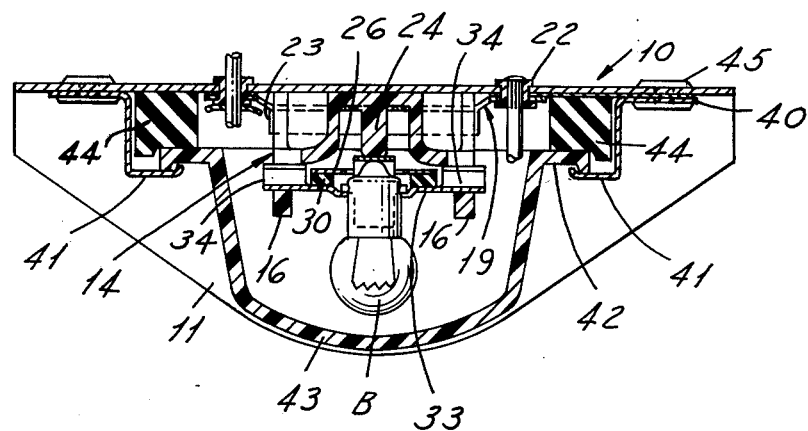
FIG. 4 is a sectional view taken along the line 4—4 in FIG. 1.

Referring to the drawings, the marker lamp embodying the invention comprises a base 10 having side walls 11 extending outwardly therefrom. A resilient support 12 is provided on the base and has a central portion with flat surface 13 which is complementary to the base. The resilient support 12 includes spaced outwardly extending projections 14 that extend at a right angle to the central portion thereof. The projections 14 have a semi-cylindrical configuration adjacent the support 12 as at 15 and a generally flat free end as at 16. Slots 17 are provided in the free ends of the projections 14 and the portions 15 have enlarged openings 18 to provide access to the slots 17 as presently described.

A retainer 19 is provided over the support 12 and has a central portion 20 that engages the base of the support 12 and spaced flanges 21 that engage the base 10. Eyelets 22 hold the retainer in position. The retainer further includes outwardly extending flanges 23 that extend at a right angle to the portion 20. An integral resilient post 24 extends outwardly from the support 12 through an opening 25 in the retainer 19.

A bulb socket assembly is removably mounted on the support 12 and comprises an insulator 26, bulb contact strip 29, intermediate member 30 and upper socket member 33.

Insulator 26 is provided which is generally flat and includes an elongated opening 27 with arcuate edges 28 at the center thereof. Insulator 26 supports bulb base contact strip 29 which has bent offset ends 29a that hold strip 29 in opening 27.

Intermediate socket member 30 which is generally flat is positioned on the insulator 26 and has an opening 31 with radially inwardly extending arcuate portions 32, sized to permit rotation of the bulb and bulb-locating pins in the area between the arcuate portions 32, but not within the area of the arcuate portions 32. The arcuate edges of the opening in the insulator 26 are sized to permit axial entry of the cylindrical bulb base but not the bulb-locating pins. The intermediate member 30 serves the basic purpose of guiding the pins of the bulb to the recesses 39 of the upper socket member 33. The upper socket member 33 serves as a bulb guide means and has outwardly extending portions 34 bent into cylindrical shape. The outer ends of legs 46 on upper socket member 33 are bent over intermediate member 30 and insulator 26 to complete the bulb socket assembly.

The portions 34 are adapted to extend into the slots 17 to retain the assembly comprising the insulator 26, intermediate socket member 30 and upper socket member 33 in position. The central portion of upper member 33 is formed with an opening 35 having axially extending portions 36 and recesses 39. Upper member 33 is placed in position by bending the free ends 16 of the outwardly extending projections 14 outwardly to permit portions 34 to engage the slots 17. Release of the free ends 16 will serve to hold the socket assembly by embracing the extending portions 34 of the upper socket member 33.

After assembly, a bulb B is inserted through the opening 35, the bulb locating pins engaging behind upper member 33 in the recesses 39, causing maintenance of the bulb position. Improper location of the bulb B is prevented by arcuate portion 32 of the intermediate member 30.

The marker lamp further includes brackets 40 which have inwardly extending flanges 41 that engage the lips 42 of the lens 43 to hold the lens against a resilient gasket 44 in the manner shown, for example, in U.S. Pat. No. 3,145,933. Eyelet 45 holds bracket 40 in position on base 10.

The present invention provides a nest for the engagement of the bulb, and pursuant to severe distortion, the present invention provides more accurate physical location of the bulb. Further, increased resilience is provided by having the electrical connections in opposed positions. Further, a substantial increase in controlled flexibility is achieved by utilizing circular column engagement members. This is due to the fact that vehicle shock is generally vertical with respect to the road surface, and the present invention provides compensating rotation about a horizontal axis to accommodate satisfactory reaction to undesirable vibratory transmissions.

The lamp is easy to assemble and is the result of an integration of componentry which does not require any fitting action, but rather a mere placement of the components. As a consequence, the cost of assembly is appreciably lower than devices suggested by the prior art. The socket assembly, as well, conforms to the goal of simplified assembly procedures.

I claim:

1. A marker lamp comprising
a base,
a resilient support having a surface complementary to the base,
a retainer engaging and maintaining said support in position,
a bulb-engaging socket assembly having outwardly extending projections,
said resilient support having upstanding columnar portions with slots therein into which said projections of said bulb-engaging socket assembly extend to support said assembly on said resilient support.

2. The combination set forth in claim 1 wherein said resilient support comprises a central column serving to compressibly support the base of the bulb.

3. The combination set forth in claim 1 wherein said slots are at a right angle to the base.

4. In a marker lamp, the combination comprising
a base,
a resilient support having a surface complementary to said base,
a retainer engaging said support and holding said resilient support in position on said base,
a contact assembly comprising an insulator,
a contact member,
an intermediate member,
an upper socket member,
said insulator supporting said contact member,
said insulator having an elongated opening with arcuate edges along a portion thereof,
said intermediate member being mounted on said insulator and having an opening with radially inwardly extending arcuate portions for receiving a bulb,
said upper socket member having axially extending cylindrical portions for guiding a bulb,
said resilient support having outwardly extending portions extending therefrom,
said upper socket member having laterally extending projections engaging said outwardly extending portions to support said contact assembly.

5. The combination set forth in claim 4 wherein said outwardly extending portions on said resilient support include slots,
said laterally extending projections of said upper socket member engaging said slots.

6. The combination set forth in claim 5 wherein said slots extend at a right angle from said base.

7. The combination set forth in claim 4 wherein said retainer includes outwardly extending flanges.

8. The combination set forth in claim 4 wherein said socket contact member comprises an opening through which the base of a bulb may extend,
said opening having inwardly extending projections for engagement by the lugs on the bulb to retain the bulb in position.

9. The combination set forth in claim 4 including a contact supported by said insulator member for engaging the base of a bulb.

10. The combination set forth in claim 9 including an integral portion of said resilient support extending outwardly in and coaxially aligned with the contact of said insulator 11. In a marker lamp, the combination comprising
a base,
a resilient support having a central portion including a surface complementary to said base,
a contact assembly comprising a retainer engaging said support and holding said base in position on said base,
an insulator on said retainer,
a contact member,
an intermediate member,
an upper socket member,
said insulator supporting said contact member,
said insulator having an elongated opening with arcuate edges along a portion thereof,
said intermediate member being mounted on said insulator and having an opening with radially inwardly extending arcuate portions for receiving a bulb,
said upper socket member having axially extending cylindrical portions for guiding a bulb,
said resilient support having outwardly extending portions extending from the central portion thereof,
said upper socket member having laterally extending projections engaging said outwardly extending portions to support said contact assembly.

12. The combination set forth in claim 11 wherein said outwardly extending portions on the resilient support have a thickened portion adjacent the central portion thereof and free ends having slots therein, said laterally extending projections of said upper socket member engaging said slots.

13. The combination set forth in claim 12 wherein said slots extend at a right angle from said base.

14. The combination set forth in claim 13 wherein said retainer includes outwardly extending flanges.

15. The combination set forth in claim 14 wherein said socket contact member comprises an opening through which the base of a bulb may extend,
said opening having inwardly extending projections for engagement by the lugs on the bulb to retain the bulb in position.

16. The combination set forth in claim 15 including a contact supported by said insulator member for engaging the base of a bulb.

17. The combination set forth in claim 16 including an integral portion of said resilient support extending outwardly in and coaxially aligned with the contact on said insulator.

* * * * *